United States Patent
Santen et al.

(10) Patent No.: US 6,270,682 B1
(45) Date of Patent: Aug. 7, 2001

(54) METHOD FOR REMOVING CHLORATE IONS FROM SOLUTIONS

(75) Inventors: Rutger Van Santen, Geldrop (NL); Armin Klesing, Lueneburg (DE); Gerhard Neuenfeldt, Estorf (DE); Alfred Ottmann, Hannover (DE)

(73) Assignee: Solvay Deutschland GmbH, Hannover (DE)

(*) Notice: Subject to any disclaimer, the term of this patent is extended or adjusted under 35 U.S.C. 154(b) by 0 days.

(21) Appl. No.: 09/367,265

(22) PCT Filed: Jan. 10, 1998

(86) PCT No.: PCT/EP98/00112

§ 371 Date: Aug. 13, 1999

§ 102(e) Date: Aug. 13, 1999

(87) PCT Pub. No.: WO98/37024

PCT Pub. Date: Aug. 27, 1998

(30) Foreign Application Priority Data

Feb. 20, 1997 (DE) .............................. 197 06 590
Oct. 29, 1997 (DE) .............................. 197 47 673

(51) Int. Cl.$^7$ ........................................ C02F 1/70
(52) U.S. Cl. ................................ 210/757; 210/902
(58) Field of Search ................................ 210/668, 757, 210/902

(56) References Cited

U.S. PATENT DOCUMENTS 5,021,388 * 6/1991 Fridez et al. .................... 502/261
5,779,915 * 7/1998 Becker et al. ................... 210/757

FOREIGN PATENT DOCUMENTS

96/07617 * 3/1996 (WO) .

* cited by examiner

*Primary Examiner*—Ivars Cintins
(74) *Attorney, Agent, or Firm*—Crowell & Moring, L.L.P.

(57) ABSTRACT

The invention relates to a method for removing chlorate ions from solutions by means of catalytic treatment in the presence of hydrogen. According to the invention a rhodium and/or platinum catalyst is used. The choice of catalyst carrier depends on the amount of coadsorbents contained in the solution. The carrier material, which may be oxidic or non-oxidic, should also be easily wettable.

16 Claims, 2 Drawing Sheets

METHOD FOR REMOVING CHLORATE IONS FROM SOLUTIONS

BACKGROUND OF THE INVENTION

The invention relates to a method for the removal of chlorate ions from solutions by the catalytic treatment at a noble metal catalyst in the presence of hydrogen.

It is known from WO 96/07617, that compounds of halogen and oxygen, which are formed as byproducts of the oxidative treatment of water and are contained in water in small concentrations, can be removed by the catalytic treatment at a noble metal catalyst in the presence of hydrogen. Palladium on an oxide support is used as catalyst here, the porosity and abrasion resistance forming the criteria for selecting the support material.

The Japanese patent 63-514 describes a method for reducing the accumulation of chlorate ions in salt solutions of the chloralkali electrolysis, in that the circulating salt solution, in the presence of hydrogen, is passed over a catalyst layer. Metals or metal oxides of the eighth subsidiary group of the periodic table of elements are used as catalyst.

Information concerning the effect of the support material on the catalytic effectiveness of the metals cannot be inferred from this publication.

SUMMARY OF THE INVENTION

It is an object of the invention to make available a catalytic method for the removal of chlorate ions from solutions, which contain anionic co-adsorbates, using a modified noble metal catalyst.

It was found that, for the removal of chlorate ions from solutions, which furthermore contain co-adsorbates, the nature of the active catalytic component as well as the support material are important. The effectiveness of the method can be influenced by the targeted selection of the support material as a function of the amount of the co-adsorbates contained in the solution to be treated, this also including the pH dependence.

Pursuant to the invention, the solution, which contains the chlorate ions to be removed as well as anionic co-adsorbates, is treated in the presence of hydrogen at a supported rhodium and/or platinum catalyst. The chlorate is decomposed catalytically to chloride in accordance with the following equation:

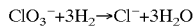

The reaction rate depends on the amount of hydrogen gas available, the temperature, the pH, the nature of the catalyst as well as on the support material.

Within the sense of the invention, support materials are understood to be inorganic materials, which may or may not be oxides, such as $ZrO_2$, SiC and activated charcoal.

It is also within the sense of the invention to modify the surface of the inorganic support material, for example, by silylation, fluorination, reduction or oxidation.

When selecting the support material, it should be noted that the porosity of the support material is not one of the criteria for selection.

Surprisingly, it was found that the support material must have a certain effective electronegativity. Moreover, the support material must be readily wettable.

Within the sense of the invention, co-adsorbates are understood to be, for example, chlorides, bromides, hydroxides, sulfates and phosphates, the co-adsorbates not being limited to those listed.

In the sense of the invention, solutions are chlorate containing effluent, process water and salt solutions of chloralkali electrolysis; there are no limitations here with respect to the chlorate concentration, which can be decomposed.

Pursuant to the invention, the solution is passed over a supported rhodium and/or platinum catalyst at a pH of 1 to 10 and preferably of 1 to 6 and/or a temperature of less than 100° C. and preferably of 40° to 90° C. and/or a pressure of 1 to 30 bar and preferably of 2 to 15 bar.

The method can be carried out continuously or discontinuously.

If the solutions to be treated have elevated chlorate concentrations (greater than 100 mg/l), the use of a three-phase reactor is appropriate. For this, the required hydrogen is made available to the reaction by material transfer

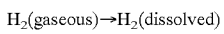

It has proven to be advantageous to use a packed bed catalyst in the three-phase reactor. By so doing, the mechanical load on the catalyst is less than in a moving bed catalyst and catalyst abrasion is thus minimized. This is important also from an economic point of view when a noble metal catalyst is used. A suitable three-phase reactor with a packed bed catalyst is, for example, a trickle bed reactor.

Surprisingly, it was found that the chemical reaction leading to the decomposition of the chlorate is limited not at the dissociation but by chlorate concentrations in the trace range (ppm) by to the adsorption of the chlorate. At high concentrations, the reaction is limited by the desorption of the reaction products.

While selecting the catalytically-active components, it was found that a catalyst, which contains rhodiumi and/or a rhodium compound, is particularly suitable for the reduction of chlorate.

When different noble metal catalysts are compared (same support material, same metal content in % by weight), the following activity sequence is obtained: Rh>Pt>Pd.

From the Journal of Catalysis, 136, pages 161 to 169, 1992, it is known that the influence of an oxide support material on a catalytic reaction in the gas phase (hydrogenation of CO on a supported Ru catalyst) can be correlated according to the Sanderson concept with an effective electronegativity (EN) of the support material.

TABLE 1

Effective Electronegativity of Support Materials
(Geometric Mean of the Allred and Rochow Atom Electronegativities)

| Support Material | EN |
|---|---|
| SiC | 2.06 |
| $ZrO_2$ | 2.45 |
| $Al_2O_3$ | 2.49 |
| Activated Charcoal | 2.5 |
| Graphite | 2.5 |

A simple transfer of this concept to reactions in an aqueous phase is not possible, since the ionicity and the wettability of the support material must be taken into consideration.

It has been found that, for the inventive method of catalytically reducing chlorate, the activity of the Rh/support system increases as the effective electronegativity of the support material decreases, if small amounts of co-adsorbates are present As the effective electronegativity of the support material increases, the inhibiting effect of the co-adsorbates on the catalytic reduction of chlorate decreases, the ionicity of the support material having to be taken into consideration in addition. Accordingly, when selecting a suitable support material for the catalytic reduction of chlorate, the co-adsorbates concentration in the solution to be treated determines the effectiveness of the method.

In addition, it must be taken into consideration that different anionic co-adsorbates have differently pronounced effects on the catalytic reduction of chlorate. Hydroxide ions have a greater effect than bromide ions and these, in turn, have a greater effect than chloride ions.

When, comparing these effects, the following sequence may be noted:

In a preferred embodiment of the invention, support materials with an effective electronegativity of less than 2.2, are used for co-adsorbate concentrations of a less than 5 g/l of chloride.

For a co-adsorbate concentration of, for example, greater than 5 g/l of chloride, a support material with an effective electronegativity of more than 2.2 is used. In addition, a further criterion for the choice of support material here is the value of the difference of the electronegativities of the atoms, contained in the support material, that is, the ionicity of the support. Pursuant to the invention, it must be less than 1, if the co-adsorbate concentration is greater than 5 g/l of chloride.

It was furthermore found that, if the solution to be treated contains an amount of co-adsorbate corresponding to less than 5 g/l of chloride, Rh/SiC proves to be the catalyst with the best chlorate decomposition result. For co-adsorbate amounts corresponding to more than 5 g/l of chloride, Rh with activated charcoal as support material proved to be the catalyst with the best chlorate decomposition values. Elevated temperatures and increased hydrogen pressures have a favorable effect on the catalytic reduction of chlorate.

It was furthermore found that the required amount of catalytically active noble metal is less than what would have been expected from the known state of the art.

The rhodium and/or platinum catalysts, used pursuant to the invention, contain 0.01 to 5% by weight and preferably 0.1 to 2% by weight of rhodium or platinum.

The catalyst is prepared in a known manner by impregnating or saturating the support with a dissolved rhodium compound or by precipitating a rhodium compound on the support material. Depending on the preparation conditions selected, it is possible to apply the metal compound on the support material in such a manner, that the metal is present only in the outer region of the support material (shell structure). Subsequently, the support catalyst is dried and heat treated in a suitable manner. Usually, the heat treatment is carried at 200° to 1,000° C. under an inert gas.

EXAMPLE

Figure 1:
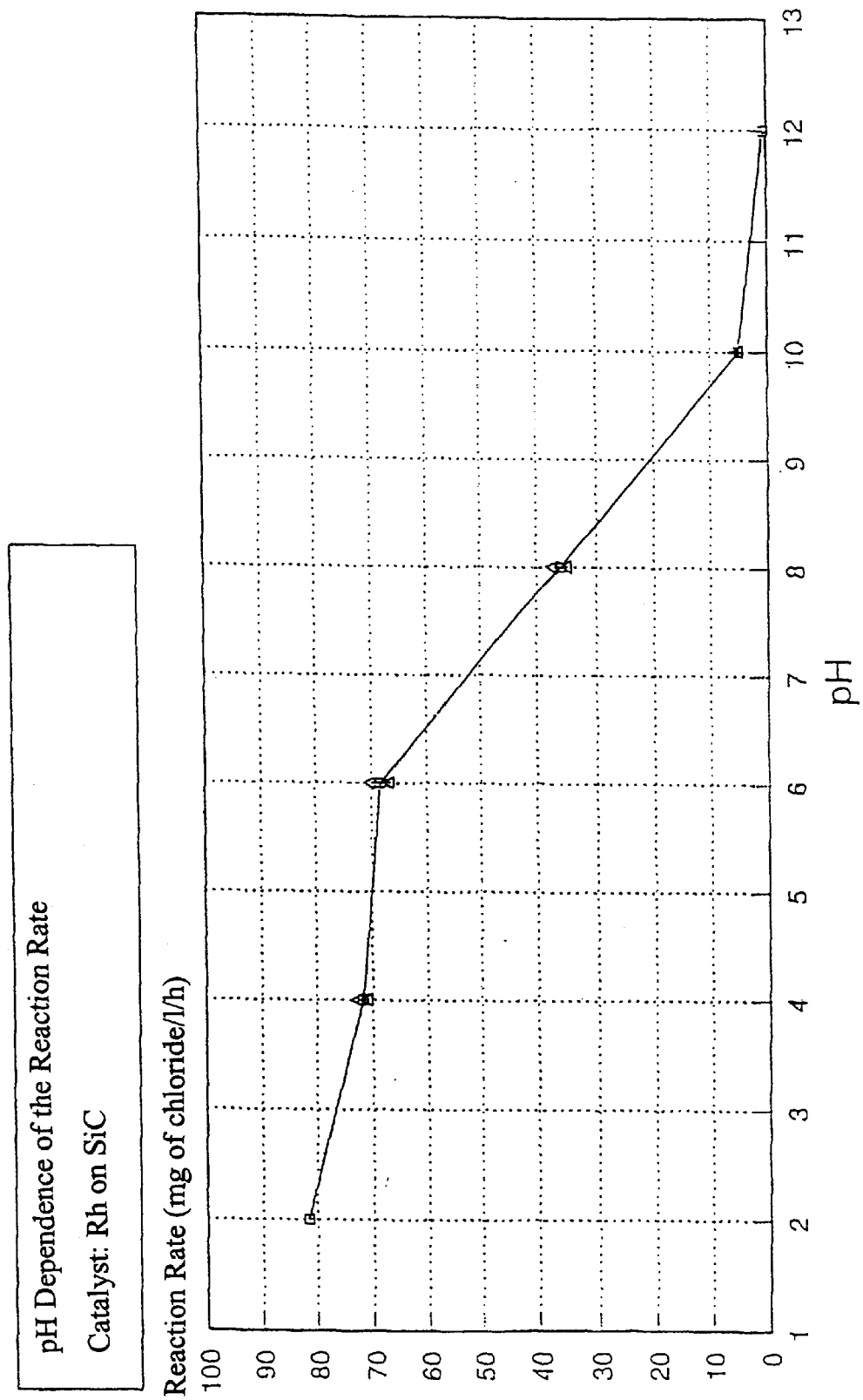
FIG. 1 is a graph showing the pH dependence of the reaction rate for a rhodium catalyst on a silicon carbide support.

The following examples are intended to explain the invention, without limiting it.

Example 1

The following catalysts were compared in the catalytic reduction of chlorate:

1% by weight of ruthenium on activated charcoal powder, 0.5% by weight of Rh on SiC powder.

To a stirred reactor, 500 ml of water (pH 4, 70° C., atmospheric pressure), which contain 1,000 mg/ of chlorate ions, were added. The inflow of hydrogen was adjusted to 6 l/h. In both cases, the catalyst concentration was 2 g/l. Both catalysts had comparable particle sizes. When the Rh/activated charcoal catalyst was used, the chloride concentration in the reaction solution was found to be 145 mg/l after a reaction time of 1 hour. When the Rh/SiC catalyst was used, the chloride concentration in the reaction solution was found to be 200 mg/l after a reaction time of 1 hour.

Example 2

The following catalysts were compared in the catalytic reduction of chlorate:

0.5% by weight of Pt on SiC powder, 0.5% by weight of Rh on SiC powder.

To a stirred reactor, 500 ml of water (pH 4,70° C., atmospheric pressure), which contained 1,000 mg/l of chlorate ions, were added. The inflow of hydrogen was adjusted to 6 l/h. In both cases, the catalyst concentration was 0.5 g/l. Both catalysts had comparable particle sizes- When the Pt/SiC catalyst was used, the chloride concentration in the reaction solution was found to be 100 mg/l after a reaction time of 2 hours. When the Rh/SiC catalyst was used, the chloride concentration in the reaction solution was found to be 150 mg/l after a reaction time of 2 hours.

Example 3

Chloralkali electrolysis solution (300 g, 210 g/l of NaCl, 14 g/l of chlorate) was treated in a stirred reactor with 5 g of catalyst (1% by weight of Rh on activated charcoal powder) at 70° C., a pH of 4 and at atmospheric pressure (hydrogen inflow: 6 l/h). For this reaction, the chlorate concentration was reduced to a value of less than 0.2 g/l. Even at a mass flow of 100 g/h through the reactor, the chlorate concentration remained at a value of less than 0.5 g/l. Even after an operating time of 800 hours, it was not possible to note any deactivation of the catalyst.

Example 4

The catalyst, 0.5% by weight of Rh on SiC powder (catalyst concentration: 0.5 g/l) was used in a stirred reactor, in order to reduce chlorate (initial concentration: 1,000 mg/l) in an aqueous solution at 50° C., having a pH of 2 and at atmospheric pressure (hydrogen inflow: 6 l/h). In the case of a pure solution, which contained only sodium chlorate, a decrease in the chlorate concentration from 1000 mg/l to 650 mg/l within a period of 2 hours was measured. If the chlorate solution additionally contained 210 g/l of NaCl, a decrease in the chlorate concentration by only 100 mg/l was noted under the same reaction conditions.

Example 5

The catalyst, 0.5% by weight of Rh on $ZrO_2$ (catalyst concentration: 2 g/l), was used in a stirred reactor, in order to reduce chlorate (initial concentration: 1,000 mg/l) in an aqueous solution at 70° C., having a pH of 4 and at atmospheric pressure. The hydrogen inflow was adjusted to 6 l/h. In the case of a pure solution, which contained only sodium chlorate, a decrease in the chlorate concentration from 1,000 mg/l to 110 mg/l within a period of 2 hours was measured.

If the chlorate solution additionally contained 50 g/l of NaCl, a decrease in the chlorate concentration of only 450 mg/l was noted under the same reaction conditions.

If the chlorate solution contained 8 g/l of NaBr instead of 50 g/l of NaCl, a decrease in the chlorate concentration to 730 mg/l was noted under the same reaction conditions.

Example 6

The catalyst, 0.5% by weight of Rh on graphite (catalyst concentration: 2 g/l) was used in a stirred reactor in order to reduce chlorate (initial concentration of 1,000 mg/i) in an aqueous solution at 50° C. having a pH of 6 and at atmospheric pressure (hydrogen inflow: 6 l/h). In the case of a pure solution, which contained only sodium chlorate, a decrease in the chlorate concentration from 1,000 mg/l to 900 mg/l within 2 hours was noted.

Example 7

The reaction rate of the catalytic reduction of chlorate at the Rh/SiC catalyst was measured in a stirred reactor at 70° C., a catalyst concentration of 0.5 g/l, a hydrogen inflow of 6 l/h and different pH values. A pure sodium chlorate solution with an initial concentration of 1,000 mg/l was chosen as substrate. The result can be seen in FIG. 1. A strong pH dependence of the reaction, which proceeds most rapidly in the acidic range, may be noted.

Example 8

A salt solution from the chloralkali electrolysis (NaCl: 210 g/l; chlorate content 17.7 g/l, pH 1.5) was reacted at 50° C. in a trickle bed reactor with hydrogen at an Rh/activated charcoal catalyst. It was possible to reduce the chlorate content to the following values as a fimction of the hydrogen pressure:

| | |
|---|---|
| 1 bar overpressure $H_2$ | 11.83 g/l |
| 2 bar overpressure $H_2$ | 7.76 g/l |
| 3 bar overpressure $H_2$ | 4.15 g/l |
| 4.2 bar overpressure $H_2$ | 1.35 g/l |
| 4.9 bar overpressure $H_2$ | 0.62 g/l |

Example 9

The reaction rate of the catalytic reduction of chlorate at an Rh/activated charcoal catalyst was measured in a stirred reactor at 70° C., a catalyst concentration of 2 g/l and a hydrogen inflow of 6 l/h at different Rh concentrations of the catalyst. A pure sodium chlorate solution, with an initial chlorate concentration of 1,000 mg/l, was selected as substrate. The following reaction rates (chloride formation) were measured as a function of the Rh concentration of the catalyst (at approximately identical Rh dispersions):

| | |
|---|---|
| 0.17% by weight of Rh | 95 mg $C^-$/ (l/h) |
| 0.41% by weight of Rh | 105 mg $C^-$/ (l/h) |
| 0.81% by weight of Rh | 135 mg $C^-$/ (l/h) |

The reaction rate therefore depends only to a subordinate extent on the Rh concentration of the catalyst.

Example 10

Figure 2:
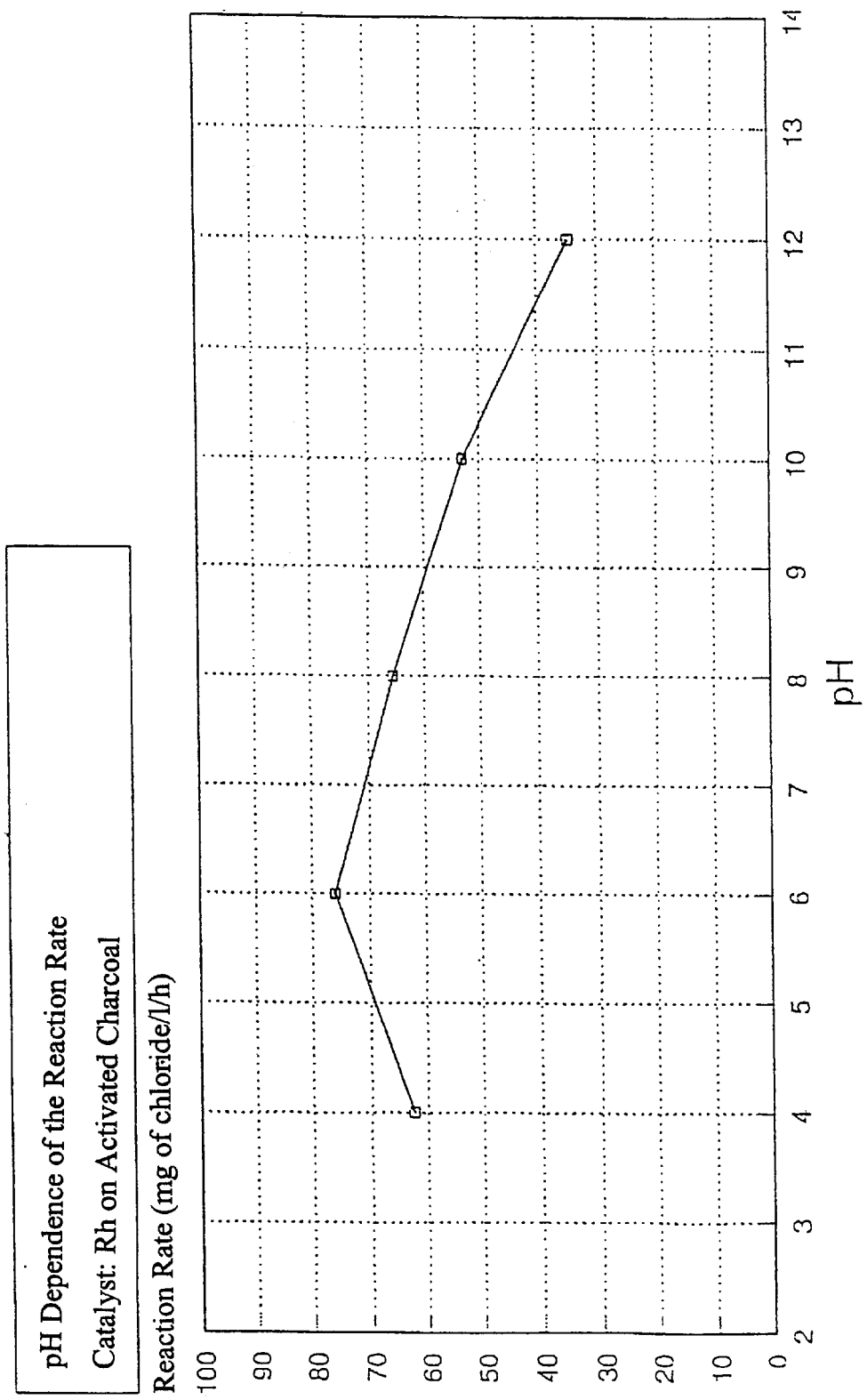
FIG. 2 is a graph showing the pH dependence of the reaction rate for a rhodium catalyst on an activated charcoal support.

The reaction rate of the catalytic reduction of chlorate at an Rh/activated charcoal catalyst was measured in a stirred reactor at 70° C., a catalyst concentration of 0.5 g/l and a hydrogen inflow of 6 l/h at different pH values. A pure sodium chlorate solution with an initial chlorate concentration of 1,000 mg/l was selected as substrate. The result can be seen in FIG. 2. The dependence of the reaction on the pH is distinctly less than in the case of the Rh/SiC catalyst (Example 7, FIG. 1).

What is claimed is:

1. A method for removing chlorate ions from a chlorate-containing solution also containing at least one anionic co-adsorbate, said method comprising subjecting the chlorate-containing solution to catalytic hydrogenation with a supported noble metal catalyst comprising at least one noble metal selected from rhodium and platinum in the presence of hydrogen, wherein the catalyst support is selected depending on the concentration of co-adsorbate contained in said chlorate-containing solution such that the support has an electronegativity of less than 2.2 when the co-adsorbate concentration is less than 5 g/liter, and the support has an electronegativity greater than 2.2 when the co-adsorbate concentration is greater than 5 g/liter, and the value of the difference of the electronegativities of the atoms, contained in the support material, being less than 1.

2. A method according to claim 1, wherein the catalytic hydrogenation is carried out at a pH of from 1 to 10.

3. A method according to claim 1, wherein the catalytic hydrogenation is carried out at a pressure of from 1 to 30 bar.

4. A method according to claim 1, wherein said catalytic hydrogenation is carried out in a three-phase reactor.

5. A method according to claim 4, wherein said three-phase reactor is a trickle bed reactor.

6. A method according to claim 1, wherein said catalytic hydrogenation is carried out at a pH from 1 to 6, a pressure of 2 to 15 bar and a temperature of less than 100° C.

7. A method according to claim 6, wherein said temperature is from 40° to 90° C.

8. A method according to claim 1, wherein the catalyst support is not an oxide.

9. A method according to claim 8, wherein the catalyst support is SiC or activated charcoal.

10. A method according to claim 1, wherein the catalyst support is an oxide.

11. A method according to claim 10, wherein the catalyst support is $ZrO_2$.

12. A method according to claim 1, wherein said chlorate-containing solution also contains chloride ions in an amount less that 5 g/liter, and the supported catalyst is selected to be rhodium on silicon carbide.

13. A method according to claim 1, wherein said chlorate-containing solution also contains more than 5 g/liter of chloride ions, and the supported catalyst is selected to be rhodium on activated charcoal.

14. A method according to claim 1, wherein the supported catalyst contains 0.01 to 5% by weight of noble metal.

15. A method according to claim 14, wherein the supported catalyst contains 0.1 to 2% by weight of noble metal.

16. A method according to claim 1, wherein said chlorate-containing solution is selected from the group consisting of effluent water, process water, and salt solutions from chloralkali electrolysis.

* * * * *